US010533638B2

(12) United States Patent
Hummel

(10) Patent No.: US 10,533,638 B2
(45) Date of Patent: Jan. 14, 2020

(54) DUAL CLUTCH TRANSMISSION FOR A MOTOR VEHICLE

(71) Applicant: AUDI AG, Ingolstadt (DE)

(72) Inventor: Steffen Hummel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 398 days.

(21) Appl. No.: 15/551,704

(22) PCT Filed: Jan. 20, 2016

(86) PCT No.: PCT/EP2016/051112
§ 371 (c)(1),
(2) Date: Aug. 17, 2017

(87) PCT Pub. No.: WO2016/131595
PCT Pub. Date: Aug. 25, 2016

(65) Prior Publication Data
US 2018/0031080 A1     Feb. 1, 2018

(30) Foreign Application Priority Data

Feb. 19, 2015   (DE) .................. 10 2015 002 134

(51) Int. Cl.
F16H 3/00      (2006.01)
F16H 3/08      (2006.01)
F16H 3/089     (2006.01)

(52) U.S. Cl.
CPC .......... F16H 3/006 (2013.01); F16H 3/089 (2013.01); F16H 2003/0803 (2013.01);
(Continued)

(58) Field of Classification Search
CPC . F16H 3/093; F16H 3/006; F16H 3/10; F16H 37/043; F16H 2003/007
(Continued)

(56) References Cited

U.S. PATENT DOCUMENTS 5,392,665 A *  2/1995  Muller ................. F16H 3/093
                                                    74/330
7,472,617 B2 *  1/2009  Nicklass ............... F16H 3/006
                                                    74/331
(Continued)

FOREIGN PATENT DOCUMENTS

CN      101398078 A    4/2009
CN      103256344 A    8/2013
(Continued)

OTHER PUBLICATIONS

International Search Report dated May 4, 2016 of corresponding International application No. PCT/EP2016/051112; 21 pgs.
(Continued)

Primary Examiner — Ha Dinh Ho
(74) Attorney, Agent, or Firm — Maier & Maier, PLLC

(57) ABSTRACT

The invention relates to a dual clutch transmission for a motor vehicle, with gear wheel sets, which can be engaged via shift elements and which, form exactly eight wheel planes, which are associated with, respectively, a first sub-transmission and a second sub-transmission, of which each sub-transmission has a respective input shaft and the two sub-transmissions have a common output shaft. The mutually coaxial input shafts can each be activated in alternation via a power-shift clutch, and the even forward gears are associated with the first sub-transmission, and the odd forward gears are associated with the second sub-transmission, which can be engaged, when a gear shift occurs, via the shift elements.

18 Claims, 2 Drawing Sheets

(52) U.S. Cl.
CPC ........... *F16H 2003/0818* (2013.01); *F16H 2003/0822* (2013.01); *F16H 2003/0826* (2013.01); *F16H 2200/0078* (2013.01)

(58) Field of Classification Search
USPC .................................. 74/330, 331, 333, 340
See application file for complete search history.

(56) References Cited

U.S. PATENT DOCUMENTS

| | | | | |
|---|---|---|---|---|
| 8,051,732 | B2* | 11/2011 | Gitt | F16H 3/006 74/330 |
| 8,627,736 | B2* | 1/2014 | Maerkl | F16H 3/093 74/325 |
| 9,114,699 | B2* | 8/2015 | Takei | B60K 6/365 |
| 2011/0030488 | A1* | 2/2011 | Gumpoltsberger | F16H 3/006 74/331 |
| 2014/0013881 | A1* | 1/2014 | Luebke | F16H 3/006 74/331 |

FOREIGN PATENT DOCUMENTS

| | | |
|---|---|---|
| CN | 103711845 A | 4/2014 |
| DE | 102011089167 A1 | 6/2013 |
| DE | 102012013248 A1 | 1/2014 |
| DE | 102012217027 A1 | 4/2014 |
| DE | 102012218793 A1 | 4/2014 |
| JP | 2014-031857 A | 2/2014 |

OTHER PUBLICATIONS

Office Action dated Dec. 27, 2018 in corresponding Chinese Application No. 201680009883.X; 12 pages.
Notification of Transmittal of Translation of the International Preliminary Report on Patentability dated Aug. 24, 2017, in connection with corresponding international application No. PCT/EP2016/051112 (20 pages).

* cited by examiner

Fig. 2

| G | K1 | K2 | RE-1 | RE-2 | RE-3 | RE-4 | RE-5 | RE-6 | RE-7 | RE-8 | SE-A | SE-B | SE-C | SE-D | SE-E | SE-F |
|---|---|---|---|---|---|---|---|---|---|---|---|---|---|---|---|---|
| 1 | X |   |   |   |   |   |   |   |   |   | re |   |   |   |   |   |
| 1 |   | X | X | X |   |   |   |   |   |   |   | = |   |   |   |   |
| 2 |   | X | X | X |   |   |   |   |   |   |   |   | = |   |   |   |
| 3 | X |   |   |   | X |   |   |   |   |   |   |   | = |   |   |   |
| 3 |   | X |   | X |   |   | X |   |   |   | = | = |   |   |   |   |
| 4 |   | X |   |   | X |   | X |   |   |   |   |   | re |   |   |   |
| 5 | X |   |   |   |   |   | X |   |   | X | re |   | re |   |   | re |
| 6 |   | X | X |   |   |   |   |   | X |   |   |   |   | re |   |   |
| 7 | X |   |   | X |   |   |   |   |   | X | = |   | = |   | = |   |
| 8 |   | X |   | X |   |   |   |   | X |   |   |   | re |   |   | = |
| 9 | X |   | X |   |   |   |   |   |   | X |   | re |   |   | = | = |
| 10 |   | X |   |   |   | X |   | X |   |   | re |   | = | = |   |   |
| 11 | X |   |   |   |   | X |   | X |   |   | = | re |   |   |   |   |
| 12 |   | X |   |   |   |   |   |   |   |   |   |   | re | = |   |   |

DUAL CLUTCH TRANSMISSION FOR A MOTOR VEHICLE

FIELD

The present invention relates to a dual clutch transmission for a motor vehicle.

BACKGROUND

Dual clutch transmissions of this type have, besides a good efficiency, the advantage that, among other things, they can be shifted or engaged automatically, in particular, without interruption of the tractive force, wherein, in the respectively non-activated sub-transmission, a gear step can already be preselected and then activated by changing the power-shift clutches. In the process, the odd gears (1, 3, 5, etc.) in one sub-transmission and the even gears (2, 4, 6, etc.) in the other sub-transmission are positioned by means of corresponding gear wheel sets, which are in driving connection with the respective input shaft or the output shaft via, for example, synchronous clutches.

The axial length of the dual clutch transmission depends on the number of gear wheel sets or wheel planes that are arranged in the dual clutch transmission in succession in the axial direction. Each of the wheel planes is made up of at least two fixed gear wheels and/or detached gear wheels. Arranged between the wheel planes are shift elements that, when actuated, enable the engagement of forward and reverse gears.

A dual clutch transmission of the generic type has gear wheel sets that can be engaged via shift elements and, in particular, form exactly eight wheel planes. The wheel planes are each associated with a first sub-transmission and a second sub-transmission. Each of the sub-transmissions has a particular input shaft as well as a common output shaft. The mutually coaxial input shafts can be activated in alternation via a particular power-shift clutch, wherein the even forward gears are associated with the first sub-transmission and the odd forward gears are associated with the second sub-transmission and, when a shift of gear occurs, these gears can be engaged via the shift element. It is possible by means of the wheel planes to engage at least one twist forward gear, in which, by use of the shift elements, exactly three wheel planes, combined in series, are engaged in the flow of torque passing through the dual clutch transmission.

SUMMARY OF THE DISCLOSURE

The object of the invention consists in providing a dual clutch transmission, which, given a design that is favorable in terms of construction, has greater degrees of freedom in terms of functionality (shifting strategy) and in terms of the gearing of the gear steps.

In accordance with the characterizing part of the present invention, the three wheel planes engaged for providing the above-mentioned twist forward gears are associated either completely with the first sub-transmission or completely with the second sub-transmission. This means that, in the case of an engaged twist forward gear, only the sub-transmission having the three twist wheel planes is incorporated in the flow of torque. The other sub-transmission is decoupled in full from the flow of torque. As a result of this, when the twist forward gear is engaged, the two sub-transmissions are not coupled to each other, so that, in the respectively non-active sub-transmission, all preselection possibilities can be used at all times without any limitation.

Preferably, for all twist forward gears that can be engaged in the dual clutch transmission, either three wheel planes from the first sub-transmission can be engaged completely or three wheel planes from the second sub-transmission can be engaged completely.

In addition, each of the wheel planes can provide a direct gear, for which exactly one wheel plane is engaged in the flow of torque passing through the activated sub-transmission. In a dual clutch transmission designed in this way, the wheel planes also provide direct gears, in addition to the twist gears. Accordingly, the wheel planes constitute, in dual function, both direct forward gears and also twist forward gears. The respective twist forward gear—in contrast to the direct forward gears—is not associated with its own wheel plane. In this way, in spite of a plurality of engageable forward gears, the construction length of the transmission is reduced in the axial direction.

Preferably, the structure of the transmission can be designed in such a way that a total of four twist forward gears can be created for a total of eight wheel planes. When the twist forward gears are provided, preferably all wheel planes of the transmission can be engaged at least one time as twist wheel planes in the flow of torque.

For engaging the forward gears, it is possible in a compact transmission design to provide exactly five shift elements that can be engaged on both sides in the axial direction, that is, SE-A, SE-B, SE-D, SE-C, and SE-F. In addition, it is possible to provide at least one shift element SE-G that can be engaged on one side. Of the five shift elements that can be engaged on both sides, exactly four shift elements, namely, SE-A, SE-B, SE-D, and SE-C, are arranged coaxially with respect to the input axis of the input shafts. In this case, exactly one shift element shift element SE-F, which can be engaged on both sides, is arranged on the output shaft. The structure of the transmission can be designed in this case in such a way that, for gear selection of the forward gears, preferably exactly two of the shift elements SE-A to SE-F can be actuated.

In a technical implementation, each input shaft of the dual clutch transmission can have exactly one shift element that can be engaged on both sides (for example, a dual synchronous clutch). By means of the first shift element SE-C, the first input shaft is coupled to or decoupled from the first to fourth wheel planes of the first sub-transmission. By means of the second shift element SE-A, in contrast, the second input shaft is coupled to or decoupled from the fifth to eighth wheel planes of the second sub-transmission.

In this case, the two coaxial input shafts no longer bear fixed gear wheels, but only the two first and second shift elements do so. As a result of this, the input shafts can be designed in a manner that uses substantially less material in comparison to the above prior art. In addition, it is possible by means of the first and second shift elements SE-C and SE-A to decouple wheel planes in the respectively activated sub-transmission at least in part from the flow of torque (that is, they can be idled), as a result of which the moment of inertia of the activated sub-transmission can be reduced. During a shifting operation, this leads to a shortening of shifting times or to a reduction of the energy effort required for the shifting operation.

The first shift element SE-C arranged in the sub-transmission can be coupled either to a drive-side detached gear wheel of a first wheel plane mounted on the first input shaft or to a hollow shaft mounted coaxially on the first input shaft. The drive-side hollow shaft mounted rotatably on the first input shaft can bear at least one, preferably two drive-side fixed gear wheels, each of which is associated with a second wheel plane and with a third wheel plane.

In a technical implementation, it is possible to additionally mount detachably a drive-side gear wheel of a fourth wheel plane on the drive-side hollow shaft of the first sub-transmission. The drive-side gear wheel of the fourth wheel plane can be coupled via a third shift element SE-D to the hollow shaft.

In an enhancement of the invention, a fifth wheel plane, which is directly adjacent to the first sub-transmission in the axial direction, is associated with the second sub-transmission. The fifth wheel plane can have a drive-side gear wheel, which is mounted rotatably on the second input shaft and preferably can be coupled by means of the above third shift element SE-D to the drive-side hollow shaft of the first sub-transmission. In this way, the fifth wheel plane can be engaged either on the first or on the second sub-transmission.

As mentioned above, the second input shaft can likewise bear exactly one second shift element SE-A, which, for example, is designed as a dual synchronous clutch. In this case, a respective drive-side detached gear wheel of an eighth wheel plane, which is mounted on the second input shaft, and a hollow shaft, which is mounted coaxially on the second input shaft, can be arranged on both sides of the second shift element in the second sub-transmission in the axial direction. The drive-side hollow shaft and the above detached gear wheel of the eighth wheel plane can be coupled (via the second shift element SE-A) in alternation to the second input shaft. The drive-side hollow shaft of the second sub-transmission can preferably bear a drive-side fixed gear wheel of the seventh wheel plane as well as a drive-side detached gear wheel of the sixth wheel plane. For engagement of the drive-side detached gear wheel of the sixth wheel plane, the drive-side hollow shaft can have a fourth shift element SE-B, with which, in the second sub-transmission, the detachably mounted drive-side gear wheel of the sixth wheel plane can be coupled to the hollow shaft. In a preferred implementation variant, it is possible by means of the above fourth shift element SE-B to couple additionally also the drive-side, detachably mounted gear wheel of the engageable fifth wheel plane on both sub-transmissions to the drive-side hollow shaft of the second sub-transmission.

In a technical implementation, the output shaft is arranged axis-parallel to the input shaft. Preferably, the output-side gear wheels of the first and second wheel planes can be arranged in the first sub-transmission in a torsionally resistant manner on a hollow shaft, which is coaxially mounted rotatably on the output shaft. The output shaft can have, in addition, a fifth shift element SE-F, by means of which, in the first sub-transmission in alternation, the hollow shaft or an output-side gear wheel of the third wheel plane can be coupled to the output shaft.

In a similar way to the first sub-transmission, it is also possible in the second sub-transmission to arrange the output-side gear wheels of the seventh and eighth wheel planes in a torsionally resistant manner on an output-side hollow shaft, which is coaxially mounted rotatably on the output shaft. The hollow shaft mounted on the output shaft in the second sub-transmission can be coupled by way of a sixth, one-side shift element SE-E to the output shaft.

In an implementation variant, the output-side gear wheel of the fifth gear wheel, which can be engaged on both sub-transmissions, can be arranged as a fixed gear wheel on the output shaft in a torsionally resistant manner. In this case, in driving operation, the fifth wheel plane would constantly co-rotate and, under circumstances, cause premature wear to the pivot bearing. Against this background, the output-side gear wheel of the fifth wheel plane can also be mounted detachably on the output shaft and can be coupled via a seventh shift element SE-G to the output shaft.

As mentioned above, at least one gear wheel set, that is, the fifth wheel plane, of the one sub-transmission can be coupled via a shift element to the other sub-transmission. As a result of this, it is possible with little added expense and effort in terms of transmission engineering and without dispensing with the advantage of acceleration of the motor vehicle without interruption of tractive force to skip at least one forward gear, that is, for example, to shift from an odd forward gear to the next odd forward gear without any delay. In particular in the case of strong motorization of the motor vehicle and in the case of defined driving conditions, this can enable an improved acceleration, occurring without any shifting delays, and, under circumstances, an improved efficiency in driving operation.

Especially preferably, the gear wheel set can form at least the 3rd forward gear of the sub-transmission, which can be connected in driving operation indirectly or directly optionally to the input shaft of the one or the other sub-transmission A, B. Resulting from this, besides the normal shifting strategy, is a variant in which it is possible to shift from the 1st gear to the 3rd gear and, as needed, from the latter to the 5th gear without interruption of the tractive force.

If, in the case of a corresponding gearing in terms of transmission engineering, said gear wheel set is also incorporated into the flow of power of the 1st forward gear, then, here, too, it is possible to switch the sub-transmission, as a result of which an additional degree of freedom in terms of functionality is created.

In a preferred embodiment of the invention, the fixed gear wheel of the gear wheel set that can be engaged on both sub-transmissions can be arranged on the common output shaft of the speed-change transmission, whereas the corresponding, engageable detached gear wheel can be coupled, in a simple manner in terms of control engineering, to the shift element SE-D of the sub-transmission A or to the shift element SE-B of the sub-transmission B. In this case, the shift elements can be dual clutches, by means of which a gear wheel set of the one sub-transmission or the gear wheel set of the other sub-transmission can be engaged.

In an advantageous enhancement of the invention, it is possible in the case of a 12-gear transmission to use only eight wheel planes by multiply using the gear wheel sets, wherein the commonly used gear wheel set of the one sub-transmission is arranged directly adjacent to the other sub-transmission. The speed-change transmission can accordingly be relatively short in construction and can be designed with the least possible number of shift elements and gear selectors.

Furthermore, it is possible to this end to fasten fixed gear wheels of a plurality of gear wheel or wheel planes of the two sub-transmissions on respectively common hollow shafts and for these to be mounted rotatably on the common output shaft as well as, via shifting clutches (that is, shift elements), to the output shaft.

Additional fixed gear wheels of the wheel planes can further be arranged on a hollow shaft, which is mounted on the input shaft of the one sub-transmission and which can be coupled by means of a shifting clutch to said gear wheel set of the other sub-transmission.

Finally, it is possible with the least possible expense and effort in terms of transmission engineering to enable the twelve forward gears to be engaged by means of five dual clutches and a single clutch, wherein four dual clutches are positioned on the coaxially arranged two input shafts of the sub-transmissions and one dual clutch as well as a single clutch is arranged on the common output shaft.

BRIEF DESCRIPTION OF THE DRAWING

An exemplary embodiment of the invention is described below in detail on the basis of the appended drawing. Shown are:

FIG. 2 a shift matrix of the speed-change transmission in accordance with FIG. 1.

DETAILED DESCRIPTION OF THE DRAWING

Figure 1:
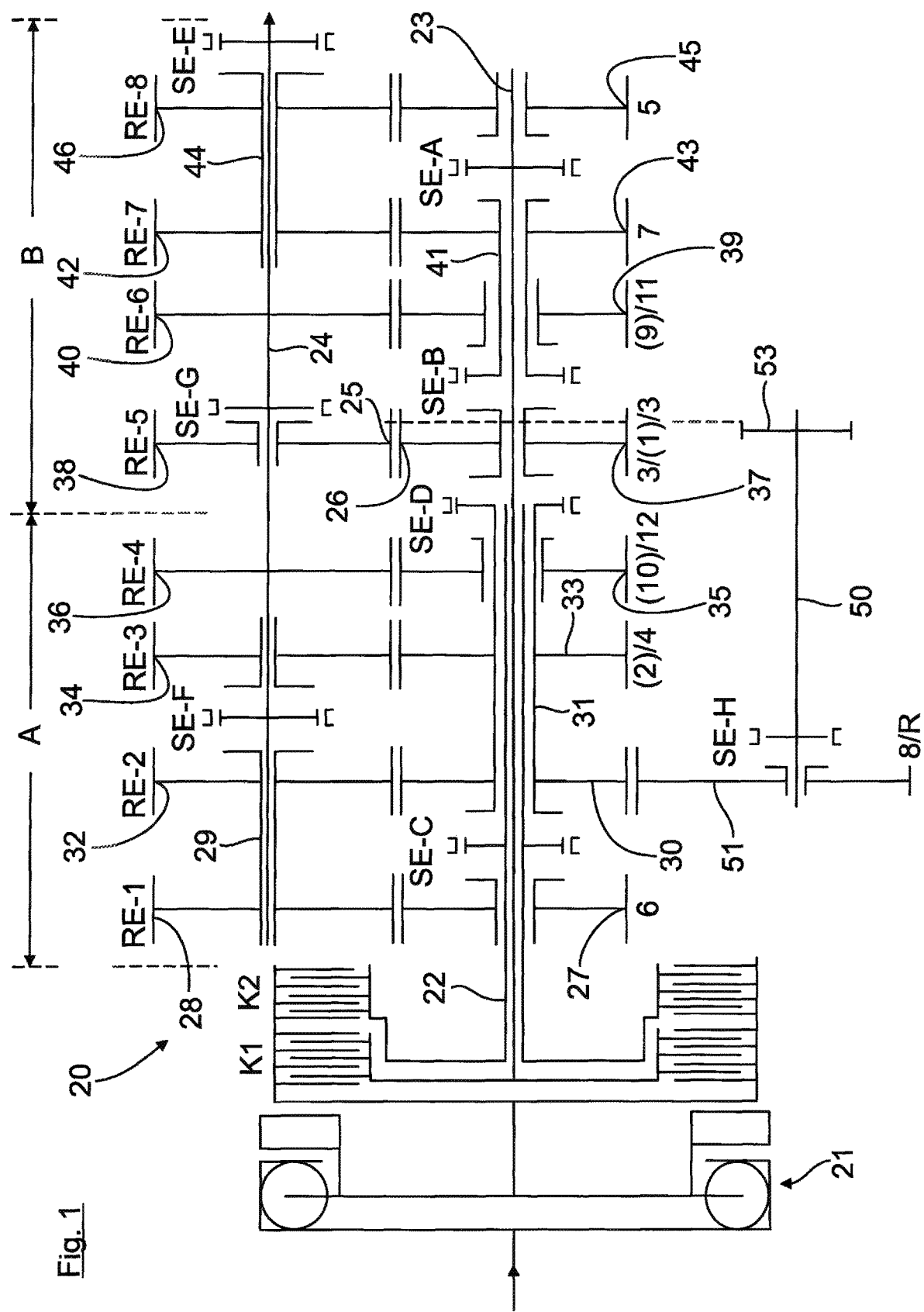
FIG. 1 as block connection diagram, a speed-change transmission for motor vehicles with two sub-transmissions, which can be activated via two power-shift clutches and which has 12 engageable forward gears, wherein a gear wheel set of the transmission can be used for both sub-transmissions.

The FIG. 1 shows a speed-change transmission or a dual clutch transmission 20 for a motor vehicle, by means of which up to twelve forward gears 1 to 12 can be engaged in eight wheel planes or with eight gear wheel sets RE-1 to RE-8. Each of the wheel planes RE-1 to RE-8 is formed from a drive-side gear wheel coaxial to the input shaft 22, 23 and an output-side gear wheel coaxial to the output shaft 24.

The speed-change transmission 20 has two input shafts 22, 23, which are in driving connection with, for example, an internal combustion engine (not illustrated) and a torsional vibration damper 21 and can be coupled via two power-shift clutches K1, K2, the input shaft 22 of which is a hollow shaft through which the second input shaft 23 passes. The rotary bearing and the corresponding transmission housing are not illustrated.

The gear wheel sets or wheel planes RE-1 to RE-8 are arranged in a way that is known as such by way of engageable detached gear wheels and by way of fixed gear wheels on the input shafts 22, 23 and on a common output shaft 24 in a way that remains to be described, wherein the gear wheel sets RE-1 to RE-4 form a first sub-transmission A and the gear wheel sets RE-5 to RE-8 form a second sub-transmission B.

The gear wheel set RE-5 of the sub-transmission B is arranged with a fixed gear wheel 38 on the output shaft 24 and with an engageable detached gear wheel 26 on the input shaft 23 axially directly adjacent to the sub-transmission A in such a way that the detached gear wheel 27 thereof can be coupled via a shifting clutch SE-D either to the sub-transmission A or via a shifting clutch SE-B to the sub-transmission B.

The arrangement of the other gear wheel sets is such that the 12 forward gears can be realized for only eight gear wheel sets RE-1 to RE-8, wherein:

the detached gear wheel 27 of RE-1 is arranged on the input shaft 22 and the fixed gear wheel 28 thereof is arranged on a hollow shaft 29, which is coaxially mounted with respect to the output shaft 24, in a torsionally resistant manner;

a fixed gear wheel 30 of RE-2 is mounted via a hollow shaft 31 on the input shaft 22 and the corresponding fixed gear wheel 32 is also arranged on the hollow shaft 29 in a torsionally resistant manner;

the detached gear wheel 27 and the hollow shaft 31 can be coupled by means of a shifting clutch SE-C in alternation to the input shaft 22;

a fixed gear wheel 33 of RE-3 is arranged on the hollow shaft 31, while the detached gear wheel 34 thereof or the hollow shaft 29 can be coupled in alternation via a shifting clutch SE-F to the output shaft 24;

further mounted on the hollow shaft 31 is a detached gear wheel 35 of the gear wheel set RE-4, which meshes with a fixed gear wheel 36 on the output shaft 24;

directly axially adjacent to the detached gear wheel 35 of the gear wheel set RE-4, the detached gear wheel 37 of the gear wheel set RE-5 is mounted on the central input shaft 23 of the sub-transmission B, which engages with the further fixed gear wheel 38 on the output shall 24;

the two detached gear wheels 35, 37 can be coupled via a further shifting clutch SE-D in alternation to the hollow shaft 31 on the input shaft 22;

in addition, the detached gear wheel 37 can be coupled via a second shifting clutch SE-B to a hollow shaft 41, which is mounted on the input shaft 23, wherein the hollow shaft 41 bears a detached gear wheel 39 of the gear wheel set RE-6, which likewise can be coupled via the shifting clutch SE-B to the hollow shaft 41;

the detached gear wheel 39 of the gear wheel set RE-6 meshes with a further fixed gear wheel 40 on the output shaft 24;

the hollow shaft 41 further has a fixed gear wheel 43 of the gear wheel set RE-7, which engages with a fixed gear wheel 42 on a hollow shaft 44, which is mounted rotatably on the output shaft 24;

the hollow shall 41 on the input shall 23 can further be connected via a shifting clutch SE-A to the input shaft 23, wherein the shifting clutch SE-A also couples a detached gear wheel 45 of the gear wheel set RE-8 in alternation to the input shaft 23;

the fixed gear wheel 46 of the gear wheel set RE-8 is arranged, in analogy to the fixed gear wheel 42 of the gear wheel set RE-7, on the hollow shaft 44, wherein the hollow shaft 44 can be connected via a single shifting clutch SE-E to the output shaft 24.

The shifting clutches SE-C, SE-F, SE-D, SE-B, and SE-A can be designed as known dual synchronous clutches (with a positioning of the control sleeves thereof in the drawing of FIG. 1 to the left (li) or to the right (re) and the shifting clutch SE-E as a single synchronous clutch (shifting position li), which are conventional in shifting transmissions and are shifted from a neutral position (as drawn) under electronic control via corresponding electrically/hydraulically operated actuators.

The clutches K1, K2 can be hydraulically power-shifted plate clutches, which, in alternation, operate the sub-transmission A or B after corresponding preselection of the gears in the flow of driving force.

The forward gears 1 to 12 (a possibly required reverse gear is not drawn for simplicity) can be engaged in accordance with the shift matrix in FIG. 2, wherein the respectively shifted gear (G) 1 to 12 is given in the left column of the matrix. The crosses (X) identify the gear wheel sets RE1 to RE8 incorporated in the respective power flow and the indication (li, left) or (re, right) gives the shifting position of the respective shifting clutches SE. It is to be noted that the gears 1 and 3 in the column G are given twice, because they can be engaged optionally via the sub-transmission B (clutch K1) or the sub-transmission A (clutch K2).

In accordance therewith, the normal shifting sequence can be 1-2-3-4-5 ff., wherein the 1st gear is engaged via the clutch K1 (sub-transmission B) and the further gears are engaged through closing of the clutches K2, K1, K2, etc. in alternation. In the sub-transmission with the open clutch, it is possible, as is known, to preselect the next gear, as a result of which, through shifting of the clutches K1, K2, it is possible to shift without interruption of the tractive force.

In the modified shifting sequence, the 2nd gear and, under circumstances, also the 4th gear are skipped without interruption of the tractive force, wherein the flow of force in the 1st gear is controlled via the clutch K1 or K2 (sub-transmission A or B) with corresponding incorporation of the gear wheel sets RE-1 to RE-8 and positioning of the shifting clutch SE (see matrix). It results from this that respectively the 3rd gear and, under circumstances, the 5th gear are already preselected and can be activated by switching the power-shift clutch without interruption of the tractive force.

Accordingly, it is possible to control, besides the normal shifting sequence of the dual clutch transmission 20, the modified shifting sequences 1-3-4-5-6 ff. in the order K2, K1, K2, K1, K2 ff. or 1-3-5-6, ff. in the order K1, K2, K1, K2 ff., wherein the shifting sequences can be predetermined via an electronic transmission control and/or can be adjusted manually depending on the operating data and driving parameters of the motor vehicle.

As ensues from the shift matrix of FIG. 2, the forward gears 3 to 8 as well as 11 and 12 are geared as direct gears, which, respectively, have exactly one engaged wheel plane in the flow of torque. By way of example, in the first forward gear (twist gear) the eighth, seventh, and fifth wheel planes RE-8, RE-7, and RE-5 are engaged in the flow of torque. In the 2nd forward gear (twist gear), the first, second, and third wheel planes RE-1, RE-2, RE-3 are engaged in the flow of torque. In the 9th forward gear (twist gear), the eighth, seventh, and sixth wheel planes RE-8, RE-7, RE-6 are engaged. When the 10th forward gear (twist gear) is engaged, the first, second, and fourth wheel planes RE-1, RE-2, and RE-4 are engaged.

For provision of the respective twist forward gears 1, 2, and 9 as well as 10, the three wheel planes to be engaged are associated either completely with the first sub-transmission A or completely with the second sub-transmission B. This means that, in the case of an engaged twist forward gear, only the sub-transmission having the three twist wheel planes is incorporated in the flow of torque of the engaged gear, whereas the other sub-transmission is decoupled in full from the flow of torque.

For formation of a reverse gear R, a reverse gear shaft 50, which bridges the two sub-transmissions A, B, is mounted in the transmission housing (not illustrated) of the dual clutch transmission axis-parallel to the input shafts 22, 23 and to the output shaft 24. The reverse gear shaft 50 bears two reversing gears 51, 53, the first reversing gear 51 of which meshes with the drive-side gear 30 of the second wheel plane RE-2 and the second reversing gear 53 meshes with the drive-side gear 37 of the fifth wheel plane RE-5.

The first reversing gear 51, which interacts with the second wheel plane RE-2 of the sub-transmission A, is designed as a detached gear wheel and can be coupled to the reverse gear shaft 50 by means of a shift element SE-H, which can be engaged at one end. The reversing gear 53, which interacts with the fifth wheel plane RE-5, is designed, by contrast, as a fixed gear wheel.

The reverse gear R is activated by shifting the shift element borne by the first input shaft 22 in of FIG. 1 to the left on the drive-side toothed gear 30 of the first wheel plane RE-1. In addition, the shift element SE-H is shifted to the left on the first reversing gear 51 and the output-side gear 38 of the intermediate wheel plane RE-5 is coupled via the shift element SE-G to the output shaft 24. Therefore, the reverse gear R is a twist gear, wherein, when the separating clutch K2 is closed, the flow of torque passes via the hollow input shaft 22 and the drive-side gear 30 of the second wheel plane RE-2 to the first reversing gear 51 and further, via the reverse gear shaft 50 as well as the second reversing gear 53, to the output-side gear 38 of the intermediate wheel plane RE-5.

The invention claimed is:

1. A dual clutch transmission for a motor vehicle, comprising:
gear wheel sets, which can be engaged via first to seventh shift elements, which form exactly eight wheel planes, which are arranged in succession in the axial direction from an input side to an output side of the dual clutch transmission in the sequence first to eighth wheel planes arranged one behind the other and which are associated, respectively, with a first sub-transmission and a second sub-transmission, of which the first sub-transmission has a first input shaft and the second sub-transmission has a second input shaft and the two sub-transmissions have a common output shaft, wherein the mutually coaxial input shafts can each be activated in alternation via a power-shift clutch, and the even forward gears are associated with the first sub-transmission and the odd forward gears are associated with the second sub-transmission, which can be engaged, when a gear shift occurs, via the shift elements, wherein, by the wheel planes, at least one forward twist gear can be formed, in which, by the shift elements, exactly three wheel planes, combined in series, are engaged in the flow of torque of the engaged gear, flowing through the dual clutch transmission, wherein the three wheel planes engaged for providing the forward twist gear are associated either completely with the first sub-transmission or completely with the second sub-transmission, and wherein, when the forward twist gear is engaged, only the sub-transmission having the three engaged wheel planes is incorporated in the flow of torque and the other sub-transmission is decoupled completely from the flow of torque, wherein all forward twist gears that can be engaged when a gear shift occurs in the dual clutch transmission can be formed either completely with three Wheel planes from the first sub-transmission or completely with three wheel planes from the second sub-transmission, so that the two sub-transmissions are not coupled to each other in the case of any of the forward twist gears.

2. The dual clutch transmission according to claim 1, wherein the dual clutch transmission is a 12-gear transmission, which has a total of eight wheel planes, with which a total of eight direct gears and a total of four twist gears can be engaged.

3. The dual clutch transmission according to claim 1, wherein, for engagement of the forward gears, exactly five shift elements that can be engaged on both sides in the axial direction are provided, and at least one shift element that can be engaged on one side is provided.

4. The dual clutch transmission according to claim 3, wherein, of the five shift elements that can be engaged on both sides, exactly four shift elements are arranged coaxially with respect to the input shaft axis of the input shafts, and exactly one shift element that can be engaged on both sides is arranged on the output shaft.

5. The dual clutch transmission according to claim 1, wherein, for engagement of all forward gears, at least two of the shift elements can be actuated.

6. The dual clutch transmission according to claim 1, wherein the input shafts are free of torsionally resistant gear wheels of the eight wheel planes arranged thereon, and the first input shaft has exactly one first shift element that can be engaged on both sides in the axial direction, and the second input shaft has exactly one second shift element that can be engaged on both sides in the axial direction, and by the first shift element, the first input shaft can be coupled to or decoupled from the first to fourth wheel planes of the first sub-transmission, and by the second shift element, the second input shaft can be coupled to or decoupled from the fifth to eighth wheel planes of the second sub-transmission.

7. The dual clutch transmission according to claim 6, wherein, respectively, a drive-side detached gear wheel of a first wheel plane, which is mounted on the first input shaft, and a drive-side hollow shaft, which is mounted coaxially on the first input shaft, are arranged on both sides of the first shift element in the axial direction, and these can be coupled in alternation via the first shift element to the first input shaft, and the hollow shaft bears a fixed gear wheel of the second wheel plane and a fixed gear wheel of the third wheel plane.

8. The dual clutch transmission according to claim 7, wherein a drive-side gear wheel of a fourth wheel plane is mounted detachably on the drive-side hollow shaft of the first sub-transmission, and the drive-side hollow shaft of the first sub-transmission can be coupled via the third shift element to the detachably mounted drive-side gear wheel of the fourth wheel plane.

9. The dual clutch transmission according to claim 6, wherein the second sub-transmission has a fifth wheel plane, which is directly adjacent to the first sub-transmission in the axial direction, and the fifth wheel plane can be coupled by the third shift element to the first sub-transmission.

10. The dual clutch transmission according to claim 9, wherein the fifth wheel plane, which can be engaged on both sub-transmissions, is detachably mounted with its drive-side gear wheel on the second input shaft and can be coupled by the third shift element to the drive-side hollow shaft of the first sub-transmission.

11. The dual clutch transmission according to claim 6, wherein, respectively, a drive-side detached gear wheel of an eighth wheel plane, which is mounted on the second input shaft, and a drive-side hollow shaft, which is mounted coaxially on the second input shaft, are arranged on both sides of the second shift element of the second sub-transmission in the axial direction, and the detached gear wheel of the eighth wheel plane and the drive-side hollow shaft of the second sub-transmission can be coupled via the second shift element in alternation to the second input shaft and the drive-side hollow shaft of the second sub-transmission bears at least one fixed gear wheel of a seventh wheel plane.

12. The dual clutch transmission according to claim 11, Wherein a drive-side gear wheel of a sixth wheel plane is detachably mounted on the drive-side hollow shaft of the second sub-transmission, and the drive-side hollow shaft of the second sub-transmission has a fourth shift element, with which the detachably mounted drive-side gear wheel of the sixth wheel plane can be coupled to the drive-side hollow shaft of the second sub-transmission.

13. The dual clutch transmission according to claim 12, wherein the drive-side gear wheel of the fifth wheel plane, which can be engaged on both sub-transmissions, can be coupled to the second sub-transmission by the fourth shift element.

14. The dual clutch transmission according to claim 13, wherein the output-side gear wheels of the first and second wheel planes of the first sub-transmission are arranged in a torsionally resistant manner on an output-side hollow shaft of the first sub-transmission, which is coaxially mounted rotatably on the output shaft.

15. The dual clutch transmission according to claim 14, wherein the output shaft has the fifth shift element, by which in the first sub-transmission, in alternation, the output-side hollow shaft of the first sub-transmission or an output-side gear wheel of the third wheel plane can be coupled to the output shaft.

16. The dual clutch transmission according to claim 15, wherein the output-side gear wheels of the seventh and eighth wheel planes of the second sub-transmission are arranged in a torsionally resistant manner on an output-side hollow shaft of the second sub-transmission, which is coaxially mounted rotatably on the output shaft.

17. The dual clutch transmission according to claim 16, wherein the output shaft has a sixth shift element, by which the output-side hollow shaft of the second sub-transmission can be coupled to the output shaft.

18. The dual clutch transmission according to claim 17, wherein the output-side gear wheel of the fifth wheel plane, which can be engaged on both sub-transmissions, is mounted detachably on the output shaft and can be coupled to the output shaft via a seventh shift element.

* * * * *